United States Patent [19]

Sabol

[11] 4,367,798
[45] Jan. 11, 1983

[54] HORSE HOOF CLEANING TOOL

[76] Inventor: Linda M. Sabol, 4270 Potomac Ave., West Palm Beach, Fla. 33406

[21] Appl. No.: 264,356

[22] Filed: May 18, 1981

Related U.S. Application Data

[63] Continuation of Ser. No. 74,433, Sep. 16, 1979, abandoned.

[51] Int. Cl.³ ............................................. A01L 11/00
[52] U.S. Cl. .................................... 168/45; 168/48 R
[58] Field of Search ...................... 168/48, 47, 46, 45; 15/111; D30/40, 99

[56] References Cited

U.S. PATENT DOCUMENTS

D. 25,866  8/1896  Pinkerman .................... 168/48 X
181,206  8/1876  Richardson ..................... 15/111

*Primary Examiner*—Hugh R. Chamblee
*Attorney, Agent, or Firm*—Malin & Haley

[57] ABSTRACT

A combination tool for manually picking, scraping, brushing, and in general cleaning a horse's hoof. The tool includes a replacable brush threadably fastening at one end and a body having an integrally formed handle for effective and comfortable manipulation of the tool, the tool including a scraper and pick disposed at the opposite end.

2 Claims, 5 Drawing Figures

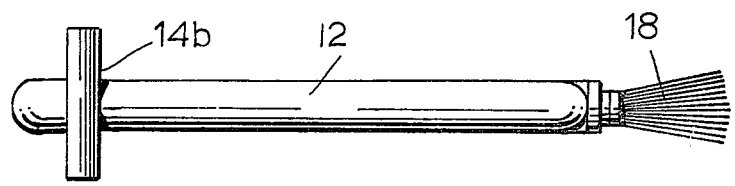
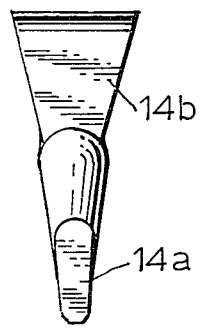
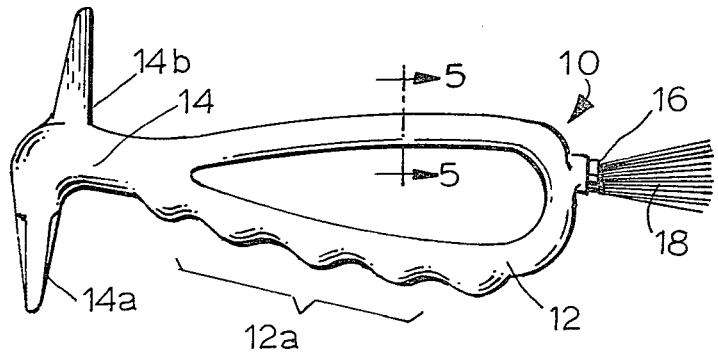
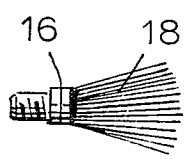
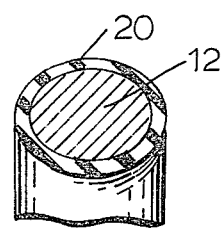

HORSE HOOF CLEANING TOOL

This is a continuation of application Ser. No. 74,433, filed Sept. 16, 1979, now abandoned.

BACKGROUND OF THE INVENTION

This invention relates in general to a tool for cleaning horse hooves, and specifically to a hand-held tool that can be used for all operations necessary in the effective cleaning and care of a horse hoof.

In a conventional hoof cleaning operation, it is common practice to use a plurality of different implements. Repetitive changing from one tool to another during the operation is time consuming. Further, some of the tools found in the prior art were cumbersome to manipulate.

The present invention overcomes these deficiencies of the tools found in the prior art by providing a single tool which is useful for all operations of horse hoof cleaning, which is comfortable for the operator and lightweight and easy to manipulate, and which includes a replacable brush mounted at one end.

BRIEF SUMMARY OF THE INVENTION

A tool useful for cleaning inner and outer portions of the hoof of a horse comprising a rigid, elongated narrow body, said body having a tapered, protruding portion disposed ninety degrees near one end, a second protrusion on the opposite side of said body end, the second protrusion having an outwardly tapered flat end, and a brush having a threadable connector at one end mounted in a socket that is threaded at the body end of the device opposite the first and second protrusions.

The first protrusion which is somewhat conical in shape lies in the plane of the body and points in the direction on the same side of the undulations in the body forming the handle. The first protrusion acts as a hook that can be used for dislodging clay or mud from the interior of the horse's hoof.

The second protrusion which is outwardly tapered is also somewhat flat near its end portion and can be used as a scraper for scraping mud and dirt from outer areas of the hooves.

The brush is mounted so that it protrudes along the longitudinal axis of the tool at the end opposite the hook and scraper.

The body of the tool is of a rigid material, such as metal, and includes an open portion in the center, the rigid metal being covered with rubber or vinyl. The lower arm of the body includes a rounded or undulated finger receiving recesses for easier grasping. The tapered body shape is narrower near the hook and scraper end and wider at the brush end. The handle is shaped such that the tool may be grasped from either direction.

Since the brush is threadably connected to the body of the tool, when the brush wears out it may be easily and conveniently replaced.

It is an object of this present invention to provide a cleaning tool capable of use and performance of all phases of operation necessary for the cleaning of a horse hoof.

A further object of the present invention is to provide a horse hoof cleaning device which can be operated comfortably with one hand.

A still further object of this invention is to provide a horse hoof cleaning device which has a unitarily formed scraper for scraping caked mud and dirt off of the outer hoof wall, and includes a replacable brush removably connected to the body of the tool.

In accordance with these and other objects which will be apparent hereinafter, the instant invention will now be described with particular reference to the accompanying drawings.

BRIEF DESCRIPTION OF THE DRAWINGS

FIG. 1 shows a side elevational view of the present invention.

FIG. 2 shows a top plan view of the present invention.

FIG. 3 shows a front elevational view of the present invention.

FIG. 4 shows a brush attachment utilized with the present invention in a side elevational view.

FIG. 5 shows a cross-sectional view through line 5—5 of FIG. 1.

PREFERRED EMBODIMENT OF THE INVENTION

Referring now to the drawings and specifically FIG. 1, the present invention is shown generally at 10 comprised of an eclipse-shaped, rigid body 12 with undulations 12a for receiving the fingers, the body 12 having a brush 18 attached at one end by a connector 16, and a scraper and hook head 14 which includes scraper 14b and hook 14a attached at the opposite end of body 12. The tool could be made without the undulations if desired.

FIGS. 2 and 3 show the location in relationship of the brush and scraper 14b and the forward portion of hook 14a.

The scraper 14b, which is used to scrape the horse's hoof, is in the shape of an inverted trapezoid and projects from the upper head 14 of the device.

The hook 14a is conical in shape and is disposed at a ninety degree angle to the longitudinal axis of the body 12.

The brush 18, which is removable and replacable, includes a threaded connector 16 and as such allows one to use a stiff bristle brush when necessary during the hoof-cleaning operation.

The body 12, as shown in FIG. 5, may be rubber coated by coating 20 for protecting the body and for the comfort of the user.

Thus as shown in the drawings, a single device is presented which has the capability of performing scraping, brushing off of loose dirt with a brush, and for picking out caked dirt from the frog groove of a horse's hoof.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A combination tool for performing all operations necessary to clean and care for a horse's hoofs including manually picking, scraping, and brushing the horse's hoofs comprising:

an elongated, narrow, generally open-centered rigid body, said body having an upper portion, a lower portion, a first end, a mid portion, and a second end, said body lower portion including undulations for receiving the fingers of a user, said first end including first and second protrusions lying in the plane of the body, and perpendicular to the longitudinal axis of said body said first protrusion being substantially conical in shape tapering toward the protruding end to a rounded point, said first protrusion including first and second flatened portions on opposing sides of said first protrusion, said flatened portions lying and facing in the plane of the body, said second protrusion being substantially trapazoidal in shape, with the outer protruding end being wider than the inner portion, said second protrusion having flatened edge portions on opposing edges of said second protrusion which lay in the plane of the body, said second protrusion having flatened side portions on opposing sides of said second protrusion which are generally perpendicular to the longitudinal axis of said body tapering toward the protruding end to a relatively sharp straight straper edge; and a brush having a plurality of bristols, said brush being attached to said second end of said body said bristols of said brush extending in a direction in the plane of said body, whereby said tool first protrusion is useful for dislodging clay or mud from the interior of a horse's hoof, said second protrusion can be used for scraping mud and dirt from the outer areas of the horse's hoof, and the brush can be used for cleaning the horse's hoof.

2. A tool as in claim 1, wherein:

said brush includes a threaded fastening means, said second end body portion including a threaded fastener whereby said brush is removeably attached to said body.

* * * * *